(12) United States Patent
Tada

(10) Patent No.: US 7,033,081 B2
(45) Date of Patent: Apr. 25, 2006

(54) BALL BEARING

(75) Inventor: Seiji Tada, Kashiwara (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 10/068,100

(22) Filed: Feb. 5, 2002

(65) Prior Publication Data

US 2002/0110298 A1 Aug. 15, 2002

(30) Foreign Application Priority Data

Feb. 9, 2001 (JP) .......................... P2001-034170

(51) Int. Cl.
*F16C 33/38* (2006.01)
*F16C 19/04* (2006.01)

(52) U.S. Cl. .................. 384/523; 384/490; 384/528

(58) Field of Classification Search ............... 384/523, 384/490, 513, 516, 517, 524, 528
See application file for complete search history.

(56) References Cited

U.S. PATENT DOCUMENTS 3,429,626 A * 2/1969 Teufel .................. 384/572
3,482,297 A * 12/1969 Vannest ............... 29/898.067
3,918,778 A * 11/1975 Jacobson et al. ........... 384/447
4,386,811 A * 6/1983 Heemskerk et al. ........ 384/523
4,473,260 A * 9/1984 Nosaka et al. ............. 384/523
5,522,667 A * 6/1996 Miyake ..................... 384/492

FOREIGN PATENT DOCUMENTS

| JP | 61-160628 | 7/1986 |
| JP | 6-32740 | 4/1994 |
| JP | 6-32744 | 4/1994 |
| JP | 07004439 A | 1/1995 |
| JP | 10-9271 | 1/1998 |

* cited by examiner

*Primary Examiner*—David Fenstermacher
*Assistant Examiner*—Colby Hansen
(74) *Attorney, Agent, or Firm*—Jordan and Hamburg LLP (57) ABSTRACT

A ball bearing in which an annular cage with a plurality of pockets formed through the annular cage is incorporated between inner and outer rings, a ball is housed in each pocket, the annular cage is guided by the outer ring, and a relationship between a radial clearance (guide clearance) $\alpha$ of the annular cage with respect to the outer ring and an axial clearance (pocket clearance) $\beta$ of an inner wall face of the pocket with respect to the ball is set at $\alpha \leq \beta$.

5 Claims, 7 Drawing Sheets

FIG. 4A $\alpha > \beta$

FIG. 4B $\alpha > \beta$

FIG. 4C $\alpha = \beta$

FIG. 4D $\alpha < \beta$

BALL BEARING

BACKGROUND OF THE INVENTION

1. Field of the Invention

The present invention relates to a ball bearing, and more particularly to a ball bearing in which an annular cage having cylindrical pockets radially passing through the annular cage is guided by one of bearing rings.

2. Description of the Related Art

In a ball bearing, in general, an annular cage having pockets in several positions in a circumferential direction is incorporated between a pair of bearing rings disposed inside and outside in a radial direction. A ball is housed in each pocket of the annular cage.

There are annular cages of a type guided by balls and of a type guided by an inner ring as an inside bearing ring or an outer ring as an outside bearing ring. Normally, the annular cage of the latter type guided by the outer ring is selected for use for high-speed rotation.

The present inventor examined states of vibration and a temperature rise of the ball bearing of the type in which the annular cage is guided by one of the bearing rings. As a result, the vibration and temperature rise were liable to be generated when a radial clearance (guide clearance) of the annular cage with respect to the one bearing ring was set to be larger than an axial clearance or a circumferential clearance (pocket clearance) of a pocket inner wall face with respect to the ball.

In other words, as a result of eccentric rotation of the annular cage due to centrifugal force in the high-speed rotation, the inner wall face of the pocket interferes with the ball from the radial or circumferential direction. Therefore, each ball advances and lags. As a result variations in a pitch error of the balls increase to thereby cause a minute slip of the ball, which leads to generation of the above-described vibration and temperature rise.

SUMMARY OF THE INVENTION

In a ball bearing of the present invention, in summary, an annular cage with cylindrical pockets along an radial direction and formed through the annular cage in several positions on a circumference is incorporated between a pair of bearing rings disposed inside and outside in the radial direction, a ball is housed in each pocket, and the annular cage is guided by one of the bearing rings. A relationship between $\alpha$ and $\beta$ is set at $\alpha \leq \beta$ if a guide clearance of the annular cage with respect to the one bearing ring is $\alpha$ and a pocket clearance of a pocket inner wall face with respect to the ball is $\beta$. According to such a ball bearing, the annular cage is guided by the one bearing ring even if the annular cage rotates in an eccentric manner in high-speed rotation. Thus, the inner wall face of the pocket hardly interferes with the ball especially when the annular cage is displaced in the radial direction. As a result, behavior of the annular cage becomes liable to be stable. Each ball becomes less liable to advance and lag.

Especially, in the ball bearing of the invention, a relationship between $\alpha$ and $\beta$ is set at $x+y<\alpha \leq \beta+x$ if an expansion amount of the annular cage in the radial direction due to rotational centrifugal force is x and an expansion amount of the annular cage in the radial direction due to thermal expansion is y. By such a setting, the expansion amount x of the annular cage in the radial direction due to rotational centrifugal force and the expansion amount y of the annular cage in the radial direction due to thermal expansion are added and the invention becomes more effective in terms of practical use.

In the ball bearing of the invention, it is preferable that races with sectional shapes corresponding to parts of an arc are provided to the inner and outer bearing rings. The balls are in contact with the races in both of the bearing rings with predetermined contact angles. By such contact, the invention is formed into an angular contact ball bearing in which a preload is applied to make an internal clearance substantially zero as a type of the ball bearing. Therefore, advance and lag of the ball is suppressed. As a result, the invention is more effective to prevent interference between the balls and the annular cage.

BRIEF DESCRIPTION OF THE DRAWINGS

These and other objects as well as advantages of the invention will become clear by the following description of preferred embodiments of the invention with reference to the accompanying drawings, wherein.

DETAILED DESCRIPTION OF PREFERRED EMBODIMENTS

A ball bearing according to preferred embodiments of the present invention will be described in detail by reference to FIGS. 1 to 6. This ball bearing can be applied not only to an angular contact ball bearing but also to other types of ball bearings.

Figure 1:
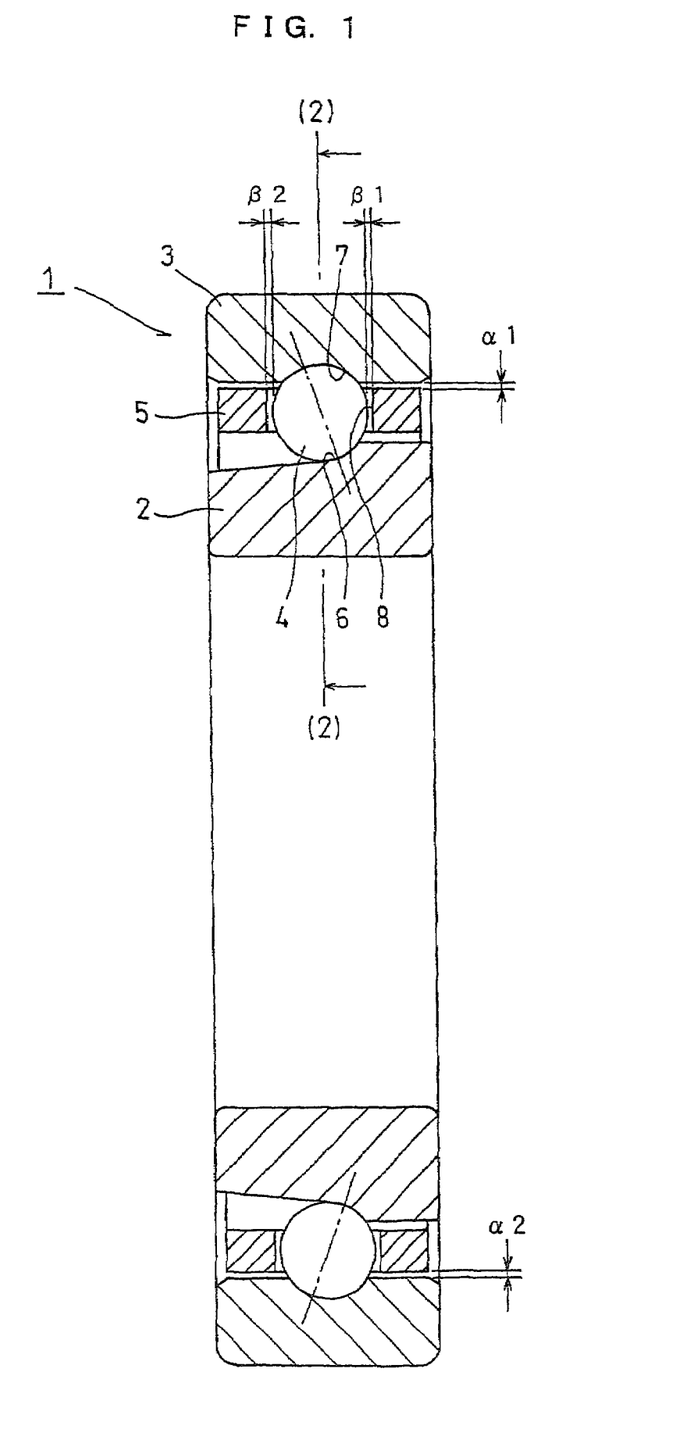
FIG. 1 is a sectional view of an angular contact ball bearing according to a preferred embodiment of the present invention.

The angular contact ball bearing 1 includes an inner ring 2, an outer ring 3, a plurality of balls 4, and an annular cage 5.

The inner ring 2 and the outer ring 3 form a pair of bearing rings disposed to face each other inside and outside in a radial direction.

A race 6 is formed in an axial intermediate position of an outer peripheral face of the inner ring 2. A sectional shape of the race 6 is a shape corresponding to a part of an arc. A counter bore with a diameter gradually reducing from the race 6 toward an axial end side is formed at axial one end portion on an outer peripheral face of the inner ring 2.

A race 7 is formed in an axial intermediate position of an inner peripheral face of the outer ring 3. A sectional shape of the race 7 is a deep groove shape corresponding to a part of an arc.

A pre-load is applied to the balls 4 such that the balls 4 are brought into contact with the respective races 6 and 7 of the respective inner and outer rings 2 and 3 at predetermined contact angles.

The annular cage 5 is disposed in an annular space between the inner ring 2 and the outer ring 3 where the inner and outer rings 2 and 3 face each other. The outside surface of the annular cage 5 is disposed close to the inner peripheral face of the outer ring 3 such that the annular cage 5 rotates along the inner peripheral face of the outer ring 3, which is referred to as outer ring guide.

Figure 3:
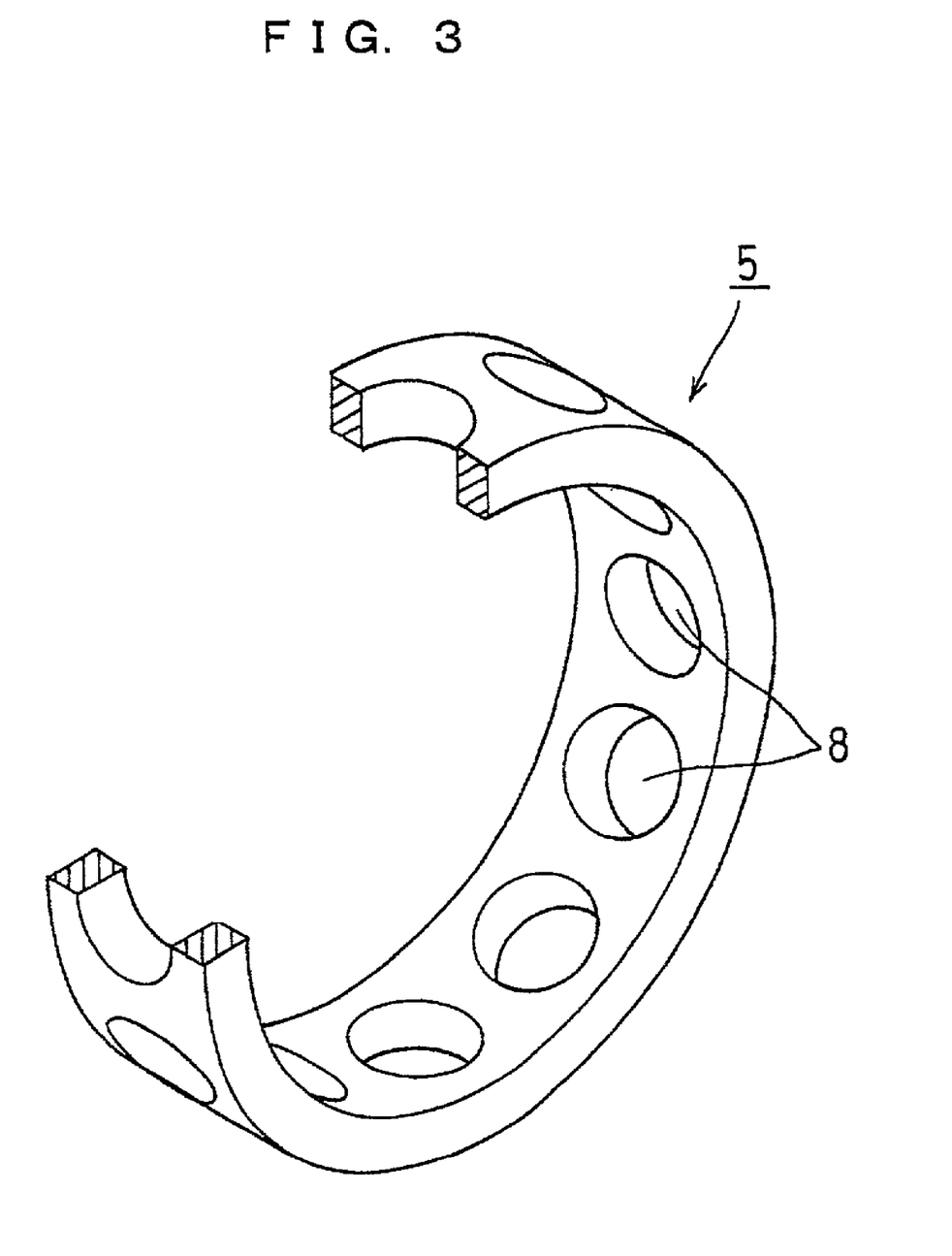
FIG. 3 is a perspective view of an annular cage with a portion cut out.

A pocket 8 for housing each of a plurality of balls 4 is formed to radially pass through each of several positions of a circumference of the annular cage 5. The annular cage 5 is of a so-called machined type.

Each pocket 8 in the annular cage 5 is formed into a cylindrical shape along a radial direction. In this case, the annular cage 5 may be of a type called a pin type in which two annular members facing each other in an axial direction are coupled by a rivet.

In such an angular contact ball bearing 1, the outer ring 3 is fixed so as not to rotate, the inner ring 2 is rotatable, and the annular cage 5 is guided by the outer ring 3.

In this angular contact ball bearing 1, an internal clearance is set at zero by applying the pre-load in a state in which the bearing 1 is incorporated into a place where the bearing 1 is used. Here, the internal clearance refers to a distance by which the one bearing ring can be moved in the radial or axial direction with respect to the other bearing ring in the angular contact ball bearing before mounting. The distance in the radial direction is referred to as a radial clearance and the distance in the axial direction is referred to as an axial clearance.

Figure 2:
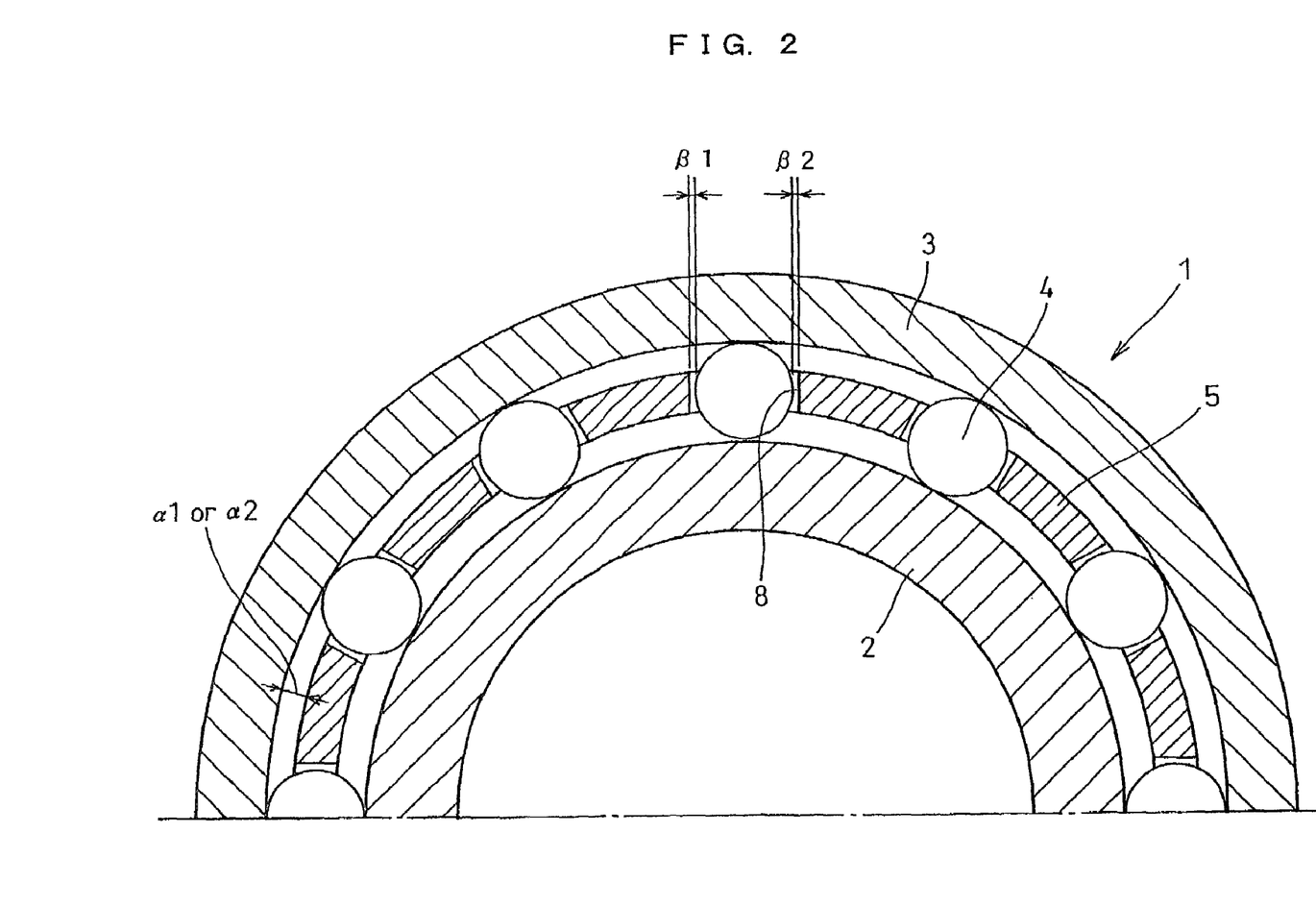
FIG. 2 is a view taken along a line (2)—(2) in FIG. 1.

In the angular contact ball bearing 1 having the above structure, if a radial clearance (guide clearance) of the annular cage 5 with respect to the outer ring 3 is $\alpha$ and an axial clearance or a circumferential clearance (pocket clearance) of the pocket 8 of the annular cage 5 with respect to the ball 4 is $\beta$, a relationship between the guide clearance $\alpha$ and the pocket clearance $\beta$ is set to be the following relational expression (1)

$$\alpha \leq \beta \quad (1)$$

The guide clearance $\alpha$ is a clearance in a state in which the annular cage 5 is put aside in the radial direction and brought into contact with the outer ring 3 and the clearance $\alpha$ is expressed by the following expression (2).

$$\alpha = \alpha 1 + \alpha 2 \quad (2),$$

where $\alpha 1$ and $\alpha 2$ are respective guide clearances between an outer peripheral face of the annular cage 5 and the inner peripheral face of the outer ring 3 on one side and the other side of the annular cage 5 in the diameter direction of the annular cage 5. For example, when $\alpha 1$ is the maximum value, $\alpha 1 = \alpha$ and $\alpha 2 = 0$. When $\alpha 2$ is the maximum value, $\alpha 2 = \alpha$ and $\alpha 1 = 0$.

The pocket clearance $\beta$ is a clearance in a state in which the annular cage 5 is put aside in the axial direction and brought into contact with the balls 4 and the clearance $\beta$ is expressed by the following expression (3).

$$\beta = \beta 1 + \beta 2 \quad (3),$$

where $\beta 1$ and $\beta 2$ are respective pocket clearances between wall faces of the pocket 8 in the annular cage 5 and the ball 4 on one side and the other side of the ball 4 in the axial direction of the annular cage 5. For example, when $\beta 1$ is the maximum value, $\beta 1 = \beta$ and $\beta 2 = 0$. When $\beta 2$ is the maximum value, $\beta 2 = \beta$ and $\beta 1 = 0$.

The above relational expression (1) between the guide clearance $\alpha$ and the pocket clearance $\beta$ was found from simulations performed by the present inventor. Description will be presented below by reference to FIGS. 4A to 4D.

FIGS. 4A to 4D respectively show a relationship between an eccentricity tolerance A of the annular cage 5 determined by the guide clearance $\alpha$ and a rattling tolerance B of the annular cage 5 determined by the pocket clearance $\beta$ when the relationship between the guide clearance $\alpha$ and the pocket clearance $\beta$ is $\alpha > \beta$, $\alpha > \beta$, $\alpha = \beta$, and $\alpha < \beta$.

Because it is preferable that the pocket clearance $\beta$ is set at a dimension determined empirically, the guide clearance $\alpha$ is used as a parameter. The number of the balls 4 to be used is 8, for example. As shown in the drawings, the eccentricity tolerance A forms a circle and the rattling tolerance B forms a polygon according to the number of balls 4 to be used and forms an octagon according to the number, 8, of the balls 4 to be used in the embodiment. A relationship between the number Z of the balls to be used and the number n of angles of the polygon of the rattling tolerance B is expressed by the following expressions (4) and (5).

$$n = Z \quad (4),$$

where Z is an even number.

$$n = 2Z \quad (5),$$

where Z is an odd number.

Figure 5:
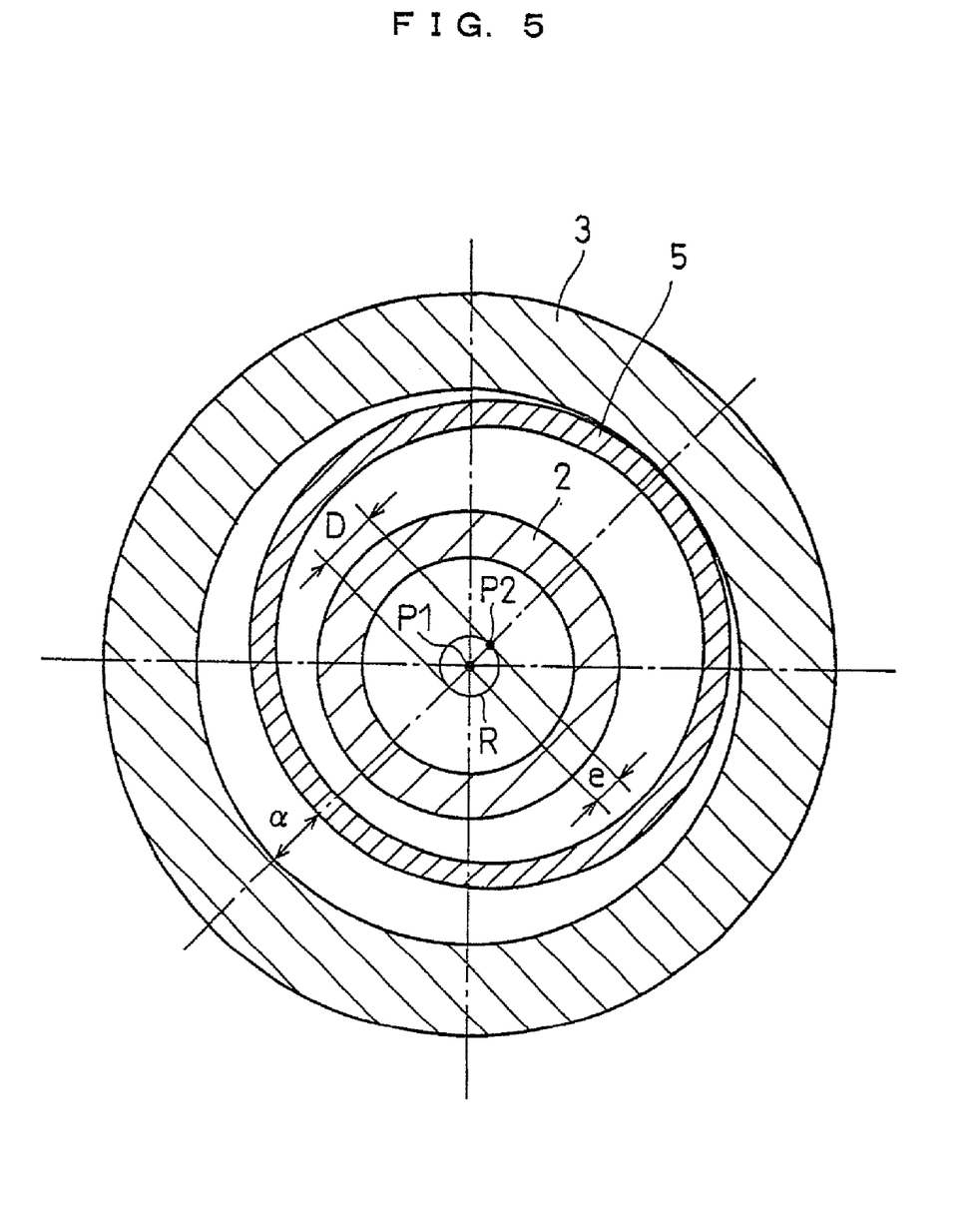
FIG. 5 is a diagrammatic illustration for explaining circular portions respectively shown in FIGS. 4A to 4D.

The eccentricity tolerance A is a range in which the annular cage 5 can rotate in an eccentric manner between the inner ring 2 and the outer ring 3. Existence of the balls 4 is ignored such that movement of the annular cage 5 is not restricted by the balls 4. The eccentricity tolerance A will be described by reference to FIG. 5. FIG. 5 shows a state in which the annular cage 5 is put aside in the radial direction and brought into contact with the outer ring 3. In FIG. 5, a reference numeral P1 designates a geometrical center of the inner ring 2 and the outer ring 3. In this case, the inner ring 2 and the outer ring 3 are incorporated such that the centers of them are aligned with each other on P1. The center P1 is defined as a point of origin of a rectangular two-dimensional X-Y coordinate system. A reference numeral P2 designates a geometrical center of the annular cage 5, a reference character e designates an eccentricity of a center P2 of the annular cage 5 with respect to the center P1, and a reference character R designates a revolution locus of the center P2 of the annular cage 5. A diameter D of the revolution locus R corresponds to the guide clearance $\alpha$. In other words, the following relational expression (6) holds between the diameter D of the revolution locus R, the eccentricity e, and the guide clearance $\alpha$.

$$D = 2e = \alpha \quad (6)$$

The rattling tolerance B refers to a range in which the annular cage 5 can move in every direction in a state in which the balls 4 are fixed in fixed positions. The rattling tolerance is shown with lines connecting displaced positions of the center P2 of the annular cage 5 when the annular cage 5 is moved in the respective directions.

Figure 4A:
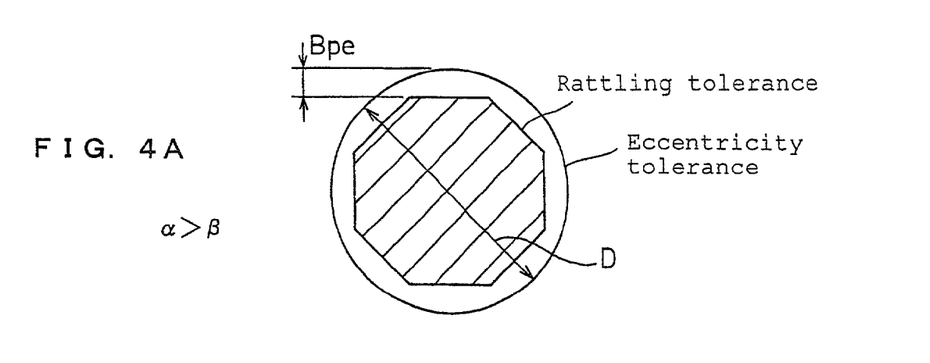
FIGS. 4A to 4D are drawings each showing a relationship between a guide clearance $\alpha$ and a pocket clearance $\beta$.
Figure 4B:
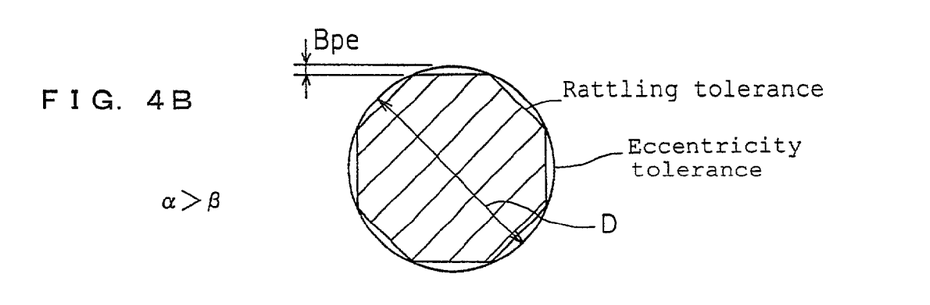

Because the eccentricity tolerance A of the annular cage 5 is determined by the guide clearance $\alpha$ and the rattling tolerance B of the annular cage 5 is determined by the pocket clearance $\beta$, a circle showing the eccentricity tolerance A of the annular cage 5 becomes larger than the octagon showing the rattling tolerance B as shown in FIGS. 4A and 4B, if a relationship between the guide clearance $\alpha$ and the pocket clearance $\beta$ is set to be $\alpha > \beta$. Therefore, if the relationship between the guide clearance $\alpha$ and the pocket clearance $\beta$ is set to be $\alpha > \beta$, movement of the annular cage 5 is restricted in a range shown with a hatch pattern. Hatch patterns in cases of FIGS. 4A and 4B are within the rattling tolerance B of the annular cage 5.

The annular cage 5 can move an extra distance Bpe in the drawings in the radial direction. Bpe is the maximum value of a difference between the eccentricity tolerance A and the rattling tolerance B. In this case, when the annular cage 5 is displaced in the radial direction as a result of rotation, inner wall faces of the pockets 8 in the annular cage 5 interfere with the balls 4 and a range of eccentricity of the annular cage 5 is restricted by the balls 4. Therefore, because large force is applied to the balls 4 due to the interference, the balls 4 are liable to advance and lag to generate a pitch error of the balls 4. The pitch error refers to irregular intervals between the plurality of balls 4 which are to be properly disposed at constant intervals in the circumferential direction.

Figure 4C:
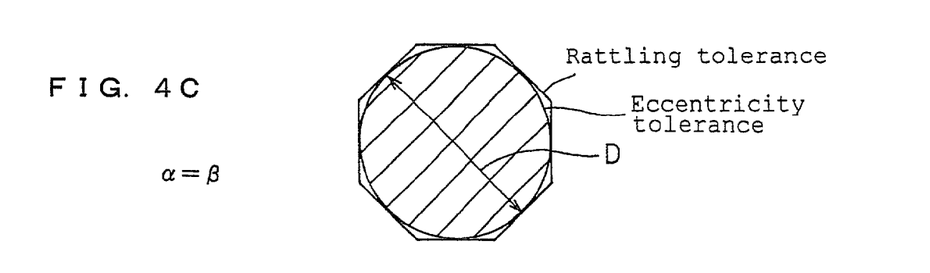

If the relationship between the guide clearance $\alpha$ and the pocket clearance $\beta$ is set to be $\alpha = \beta$, as shown in FIG. 4C, a circle showing the eccentricity tolerance A of the annular cage 5 is the largest inscribed circle of the octagon showing the rattling tolerance B. Therefore, movement of the annular cage 5 is restricted in a range shown with a hatch pattern. The hatch pattern in FIG. 4C is within the eccentricity tolerance A of the annular cage 5.

In this case, though there is a fear that the inner wall faces of the pockets 8 slightly interfere with the balls 4 when the annular cage 5 is displaced in the radial direction because of rotation, the range of eccentricity of the annular cage 5 is not restricted by the balls 4. With such slight interference, only small force is applied to the balls 4. Therefore, the balls 4 are less liable to advance and lag and the pitch error of the balls 4 can be suppressed.

Figure 4D:
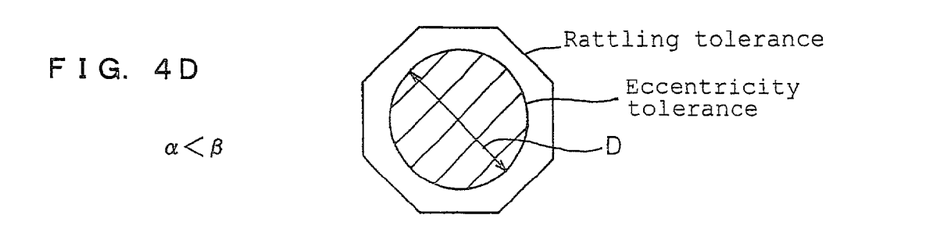

If the relationship between the guide clearance $\alpha$ and the pocket clearance $\beta$ is set to be $\alpha < \beta$, a circle showing the eccentricity tolerance A of the annular cage 5 is smaller than the octagon showing the rattling tolerance B as shown in FIG. 4D. Movement of the annular cage 5 is restricted in a range shown with a hatch pattern. The hatch pattern in FIG. 4D is within the eccentricity tolerance A of the annular cage 5.

In this case, because the inner wall faces of the pockets 8 of the annular cage 5 do not interfere with the balls 4 at all when the annular cage 5 is displaced in the radial direction because of rotation, the range of eccentricity of the annular cage 5 is not restricted by the balls 4. Therefore, the balls 4 do not advance and lag and, as a result, the pitch error of the balls 4 does not generate.

In all the cases of $\alpha > \beta$, $\alpha = \beta$, and $\alpha < \beta$, the pockets 8 may interfere with the balls 4 when the annular cage 5 is displaced in the circumferential direction. This interference is ignored in the embodiment.

Figure 6:
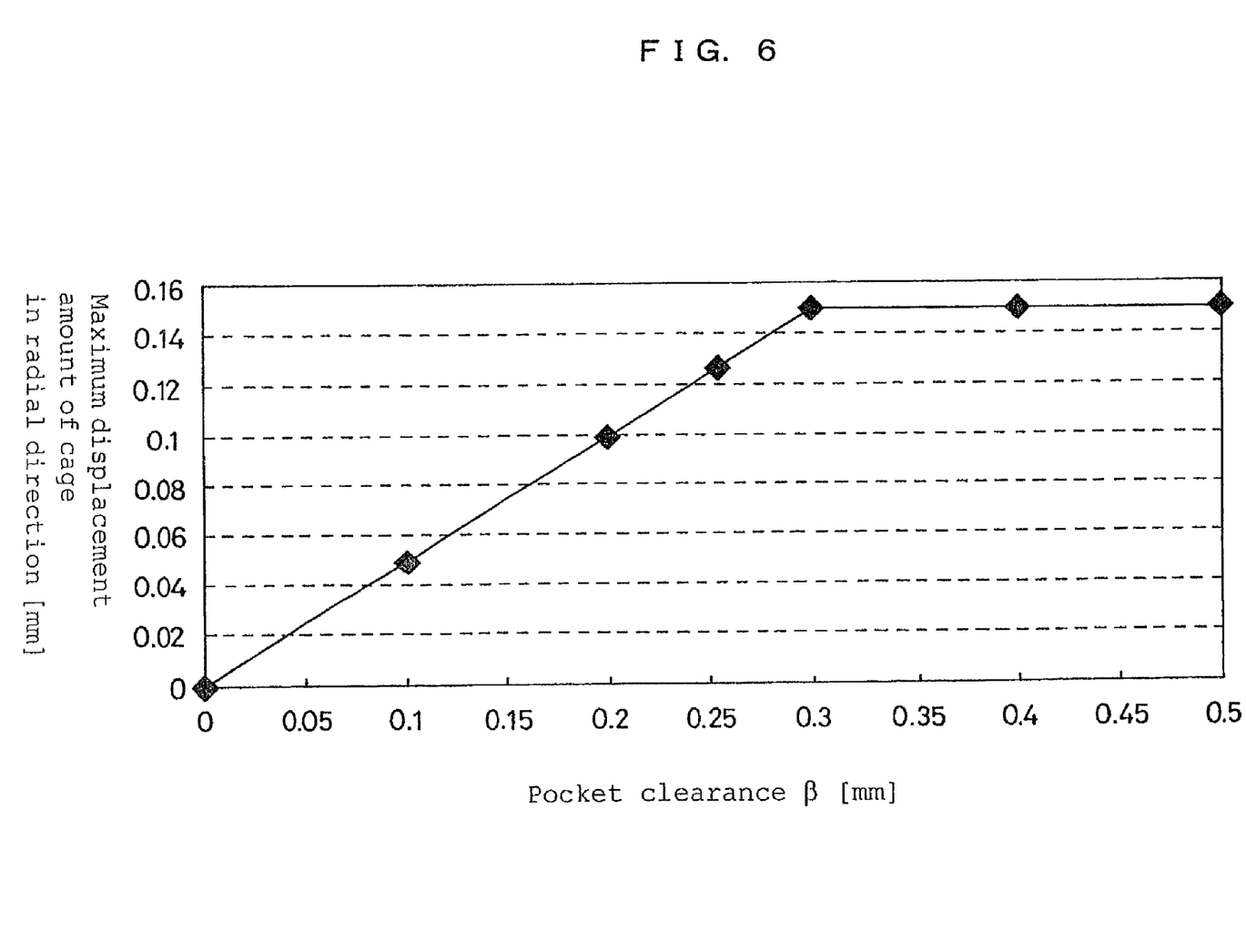
FIG. 6 is a graph showing a maximum amount of displacement of the annular cage when the guide clearance $\alpha$ is constant and the pocket clearance is a parameter.

Results of simulations of a maximum amount of displacement of the annular cage 5 in the radial direction when the guide clearance $\alpha$ is constant and the pocket clearance $\beta$ is used as a parameter in contrast to the above case will be described.

In these simulations, a diameter of each ball 4 is set at ⅜ in., the number of balls 4 is set at 27, a diameter (P.C.D.) of a circle connecting centers of the respective balls 4 is set at 112.5 mm, and the guide clearance $\alpha$ is set at 0.3 mm.

A result of the simulations is that, as shown in a graph in FIG. 6, a maximum amount of displacement of the annular cage 5 in the radial direction is 0.15 mm, i.e., the annular cage 5 comes into contact with the inner peripheral face of the outer ring 3 if the relationship between the pocket clearance $\beta$ and the guide clearance $\alpha$ is $\alpha \leq \beta$, i.e., the pocket clearance $\beta$ is 0.3 mm or greater while the guide clearance $\alpha$ is 0.3 mm. This means that the pockets 8 in the annular cage 5 do not interfere with the balls 4.

On the other hand, if $\alpha > \beta$, i.e. the pocket clearance $\beta$ is gradually reduced to be smaller than 0.3 mm while the guide clearance $\alpha$ is 0.3 mm, the maximum amount of displacement of the annular cage 5 in the radial direction is gradually reduced to be smaller than 0.15 mm and the annular cage 5 does not come in contact with the inner peripheral face of the outer ring 3. This means that the pockets 8 in the annular cage 5 interfere with the balls 4.

Based on the above-described results, it is effective that the relationship between the guide clearance $\alpha$ and the pocket clearance $\beta$ is set to be $\alpha \leq \beta$. In other words, the smaller the guide clearance $\alpha$ than the pocket clearance $\beta$, the better. However, the smaller the guide clearance $\alpha$, the more difficult processing becomes and the higher processing cost becomes. Therefore, in practice, setting the guide clearance $\alpha$ at a value equal to or slightly smaller than the pocket clearance $\beta$ is considered preferable.

As described above, if the relationship $\alpha \leq \beta$ between the guide clearance $\alpha$ and the pocket clearance $\beta$ is specified, the annular cage 5 is guided by the outer ring 3 even if the annular cage 5 rotates in an eccentric manner in high-speed rotation. Especially when the annular cage 5 is displaced in the radial direction, the inner wall faces of the pocket 8 hardly interfere with the balls 4. Therefore, behavior of the annular cage 5 is liable to be stable. Each ball 4 becomes less liable to advance and lag. As a result, rolling operation becomes stable in such a manner that minute slip of the balls 4 becomes less liable to generate. Therefore, phenomena such as generation of vibration in the angular contact ball bearing 1 and increase of a temperature over a prescribed temperature are suppressed to thereby contribute to increase of life of the bearing 1.

When the angular contact ball bearing 1 is used for high-speed rotation, rotational centrifugal force of the annular cage 5 becomes large and the annular cage 5 and the outer ring 3 are liable to generate heat because the annular cage 5 comes in contact with the outer ring 3 which guides the annular cage 5. Therefore, it is more desirable in practical terms to set the relationship between the guide clearance $\alpha$ and the pocket clearance $\beta$ in view of centrifugal expansion and thermal expansion in the annular cage 5 when the bearing 1 is used for high-speed rotation. To put it concretely, the relationship is set at the following relational expression (7) if an expansion amount of the annular cage 5 in the radial direction due to rotational centrifugal force is x and an expansion amount of the annular cage 5 in the radial direction due to a temperature rise is y.

$$x+y<\alpha \leq \beta+x \tag{7}$$

It is preferable in practical terms to set the relationship at the following relational expressions (8) and (9) in view of processing errors of the guide clearance $\alpha$ and the pocket clearance $\beta$.

$$\alpha max \leq \beta min+x \tag{8}$$

$$\alpha min > x+y \tag{9},$$

where $\alpha max$ refers to a maximum value of the guide clearance $\alpha$, $\alpha min$ refers to a minimum value of the guide clearance $\alpha$, and $\beta min$ refers to a minimum value of the pocket clearance $\beta$.

As described above, it is more effective in terms of practical use to add the expansion amount x of the annular cage 5 in the radial direction due to the rotational centrifugal force and the expansion amount y of the annular cage 5 in the radial direction due to the thermal expansion depending on a kind and a shape of base material selected as the annular cage 5.

Figure 7:
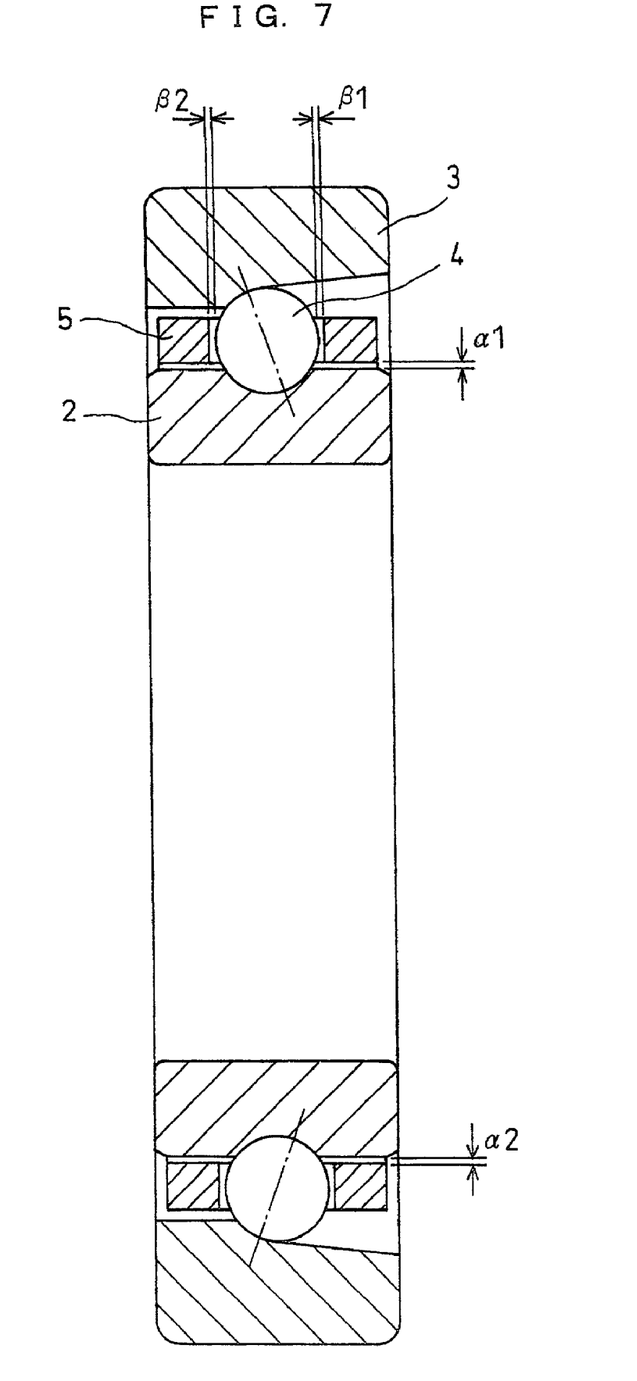
FIG. 7 is a sectional view of an angular contact ball bearing according to another preferred embodiment of the invention.

Although an example in which the annular cage 5 is of a type guided by the outer ring and used frequently for high-speed rotation of a spindle for a machine tool and the like is given in the above embodiment, the annular cage 5 may be of a type guided by the inner ring as shown in FIG. 7. The inner ring guiding refers to a type of guiding in which the inside surface of the annular cage 5 is disposed close to the outer peripheral face of the inner ring 2 such that the annular cage 5 rotates along the outer peripheral face of the inner ring 2. In FIG. 7, portions corresponding to those in FIG. 1 are provided with the same reference numerals. The angular contact ball bearing 1A shown in FIG. 7 includes an inner ring 2, an outer ring 3, a plurality of balls 4, and an annular cage 5.

A race is formed in an axial intermediate position of an inner peripheral face of the outer ring 3. A sectional shape of the race is a shape corresponding to a part of an arc. A counter bore with a diameter gradually increasing from the race toward an axial end side is formed in axial one end portion on an inner peripheral face of the outer ring 3.

A race is formed in an axial intermediate position of an outer peripheral face of the inner ring 2. A sectional shape of the race is a deep groove shape corresponding to a part of an arc.

A pre-load is applied to the balls 4 such that the balls 4 are brought into contact with the respective races of the inner and outer rings 2 and 3 at predetermined contact angles.

The annular cage 5 is disposed in an annular space between the inner ring 2 and the outer ring 3 where the inner and outer rings 2 and 3 face each other. The outside diameter surface of the annular cage 5 is disposed close to the outer peripheral face of the inner ring 2.

Conventionally, the fewer the balls 4 to be used, the smaller the number of angles of the polygon of an outside diameter shape of the rattling tolerance is, in general, and behavior of the annular cage 5 tends to be bad. Therefore, it is possible to obtain desirable effects if the invention is applied to the ball bearing in which the number of the balls 4 to be used is small.

Although the present invention applied to the angular contact ball bearing as the ball bearing has been described, the invention can also be applied to other types of the ball bearings. For example, the invention can be applied basically similarly to the embodiment to a deep groove ball bearing having a cage which is guided by the inner or outer ring and has cylindrical pockets.

While there has been described what is at present considered to be preferred embodiments of this invention, it will be understood that various modifications may be made therein, and it is intended to cover in the appended claims all such modifications as fall within the true spirit and scope of this invention.

What is claimed is:

1. A ball bearing, comprising:
   a pair of bearing rings, concentrically disposed such that a first bearing ring of said pair, having a first radius, and a second bearing ring of said pair, having a second radius, said second radius being greater than said first radius, are positioned such chat said first bearing ring is radially inward of said second bearing ring;
   an annular cage, positioned between said first and second bearing rings, said annular cage having a plurality of cylindrical through pockets positioned around a circumference thereof, each said through pocket being oriented in a radial direction through said circumference of said annular cage; and
   a plurality of balls, corresponding in number to a number of said through pockets in said circumference of said annular cage, such that each ball is housed in a corresponding one of said through pockets, wherein
   said annular cage is guided by one of said bearing rings;
   a relationship between a guide clearance $\alpha$ and a pocket clearance $\beta$ if is such that $x+y<\alpha<\beta+x$, where said guide clearance of said annular cage with respect to said one bearing ring is $\alpha$, said pocket clearance of a pocket inner wall face with respect to said bail is $\beta$, an expansion amount of said annular cage in said radial direction due to rotational centrifugal force is x, and an expansion amount of said annular cage in said radial direction due to thermal expansion is y; and
   such that said inner wall surface of said pockets of said cage does not interfere with said balls, even if said cage becomes off-centered.

2. The ball bearing according to claim 1, wherein races having arcuate sectional shapes are provided to said inner and outer bearing rings and said balls are in contact with said races in both said bearing rings at predetermined contact angles.

3. A ball bearing, comprising:
   a pair of bearing rings, concentrically disposed such that a first bearing ring of said pair, having a first radius, and a second bearing ring of said pair, having a second radius, said second radius being greater than said first radius, are positioned such tat said first bearing ring is radially inward of said second bearing ring;
   an annular cage, positioned between said first and second bearing rings, said annular cage having a plurality of cylindrical through pockets positioned around a circumference thereof, each said through pocket being oriented in a radial direction through said circumference of said annular cage; and
   a plurality of balls, corresponding in number to a number of said through pockets in said circumference of said annular cage, such that each ball is housed in a corresponding one of said through pockets, wherein
   said annular cage is guided by one of said bearing rings;
   a relationship between a guide clearance $\alpha$ and a pocket clearance $\beta$ at $\alpha_{max}<\beta_{min}+x$ and $\alpha_{min}>x+y$ if said guide clearance of said annular cage with respect to said one bearing ring is $\alpha$, said pocket clearance of a pocket inner wall face with respect to said ball is $\beta$, an expansion amount of said annular cage in said radial direction due to rotational centrifugal force is x, an expansion amount of said annular cage in said radial direction due to thermal expansion is y, a maximum value of said guide clearance $\alpha$ is $\alpha_{max}$, a minimum value of said guide clearance $\alpha$ is $\alpha_{min}$, and a minimum value of said pocket clearance $\beta$ is $\beta_{min}$; and
   such that said inner wall surface of said pockets of said cage does not interfere with said balls, even if said cage becomes off-centered.

4. A ball bearing, comprising:
   an inner ring having a race wit an arcuate sectional shape on an outer peripheral face in an axial intermediate position and a counter bore with a diameter gradually reducing from said race toward axial one end side;
   an outer ring disposed outside said inner ring and concentrically wit said inner ring and having a race with a sectional shape corresponding to a part of an arc on an inner peripheral face in an axial intermediate position;

an annular cage having cylindrical through pockets along said radial direction in several positions on a circumference and incorporated between said inner ring and said outer ring;

a plurality of balls each housed in each said pocket in said annular cage and rolling in said respective races of said inner ring and said outer ring, wherein said annular cage is guided by said outer ring, and a range representing an eccentricity tolerance in which said annular cage can rotate in an eccentric manner between said inner and outer rings is included in a range representing a rattling tolerance in which said annular cage can move in a state in which said balls are fixed by setting a relationship between a guide clearance $\alpha$ and a pocket clearance $\beta$ at x+y<$\alpha$<$\beta$+x if said guide clearance of said annular cage with respect to said inner ring is $\alpha$, said pocket clearance of a pocket inner wall face with respect to said ball is $\beta$, an expansion amount of said annular cage in said radial direction due to rotational centrifugal force is x, and an expansion amount of said annular cage in said radial direction due to thermal expansion is y; and such that said inner wall surface of said pockets of said cage does not interfere with said balls, even if said cage becomes off-centered.

5. A ball bearing, comprising:

an outer ring having a race with an arcuate sectional shape on an inner peripheral face in an axial intermediate position and a counter bore with a diameter gradually increasing from said race toward axial one end side:

an inner ring disposed inside said outer ring and concentrically with said outer ring and having a race with a sectional shape corresponding to a part of an arc on an outer peripheral face in an axial intermediate position;

an annular cage having cylindrical through pockets along said radial direction in several positions on a circumference and incorporated between said inner ring and said outer ring;

a plurality of balls each housed in each said pocket in said annular cage and rolling in said respective races of said inner ring and said outer ring, wherein said annular cage is guided by said inner ring, and a range representing an eccentricity tolerance in which said annular cage can rotate in an eccentric manner between said inner and outer rings is included in a range representing a rattling tolerance in which said annular cage can move in a state in which said balls are fixed by setting a relationship between a guide clearance $\alpha$ and a pocket clearance $\beta$ at $\alpha$<$\beta$ if said guide clearance of said annular cage with respect to said inner ring is $\alpha$ and said pocket clearance of a pocket inner wall face with respect to said ball is $\beta$;

such that said inner wall surface of said pockets of said cage does not interfere with said balls, even if said cage becomes off-centered; and wherein said eccentricity tolerance of said annular cage is included in said rattling tolerance of said annular cage by setting said relationship between said guide clearance $\alpha$ and said pocket clearance $\beta$ at x+y<$\alpha$<$\beta$+x if an expansion amount of said annular cage in said radial direction due to rotational centrifugal force is x and an expansion amount of said annular cage in said radial direction due to thermal expansion is y.

* * * * *